US012769269B2

(12) United States Patent
He et al.

(10) Patent No.: US 12,769,269 B2
(45) Date of Patent: Oct. 20, 2026

(54) INTELLIGENT CIRCULATION AND ALLOCATION CONTROL SYSTEM FOR MULTIPLE SURFACE AND GROUND WATER RESOURCES

(71) Applicant: TIANJIN UNIVERSITY, Tianjin (CN)

(72) Inventors: Li He, Tianjin (CN); Hushen Feng, Tianjin (CN)

(73) Assignee: TIANJIN UNIVERSITY (CN)

( * ) Notice: Subject to any disclaimer, the term of this patent is extended or adjusted under 35 U.S.C. 154(b) by 1190 days.

(21) Appl. No.: 17/748,448

(22) Filed: May 19, 2022

(65) Prior Publication Data

US 2022/0373987 A1 Nov. 24, 2022

(30) Foreign Application Priority Data

May 24, 2021 (CN) ......................... 202110567383.0

(51) Int. Cl.
*G05B 19/042* (2006.01)

(52) U.S. Cl.
CPC .... *G05B 19/042* (2013.01); *G05B 2219/2605* (2013.01)

(58) Field of Classification Search
CPC .......... G05B 19/042; G05B 2219/2605; G05B 13/042; C02F 1/24; C02F 1/441; C02F 1/444; C02F 1/488; C02F 1/52; C02F 1/66; C02F 1/78; C02F 3/102; C02F 3/2806; C02F 2001/007; C02F 2103/06; C02F 2103/365; C02F 2201/007; C02F 2209/006; C02F 2209/02; C02F 2209/05; C02F 2209/06; C02F 2209/08; C02F 2209/22; C02F 2209/42; C02F 9/00; C02F 1/008; Y02A 20/152; G06F 17/10
See application file for complete search history.

(56) References Cited

U.S. PATENT DOCUMENTS 6,725,208 B1 * 4/2004 Hartman .............. G05B 13/027 706/23
8,096,140 B2 * 1/2012 Seem ................. G05D 23/1917 454/258

(Continued)

*Primary Examiner* — Brian J. Sines

(57) ABSTRACT

Disclosed is an intelligent circulation and allocation control system for multiple surface and ground water resources, including a physical, chemical and biological multi-stage decentralized restoration system, which is respectively connected with a water quality detection and reinjection system, an integrated data processing system, an intelligent safety early warning system, and an asynchronous and self-adaptive dual-regulation optimization control system, the water quality detection and reinjection system is connected with the intelligent safety early warning system, the intelligent safety early warning system is connected with the integrated data processing system, and the integrated data processing system is further connected with the asynchronous and self-adaptive dual-regulation optimization control system. The intelligent circulation and allocation control system is based on an improved wastewater treatment process coupling physical, chemical and biological technologies and combined with an artificial intelligence technology to treat various water sources in a macroscopic water environment and optimize allocation control.

10 Claims, 4 Drawing Sheets

(56) References Cited

U.S. PATENT DOCUMENTS

| | | | | |
|---|---|---|---|---|
| 2004/0049299 | A1* | 3/2004 | Wojsznis | G05B 13/042 700/28 |
| 2011/0049028 | A1* | 3/2011 | Olson | C02F 1/004 210/170.03 |
| 2011/0098862 | A1* | 4/2011 | Andrei | G05B 19/41865 700/272 |
| 2011/0106277 | A1* | 5/2011 | Sayyar-Rodsari | G05B 13/04 700/33 |
| 2019/0024925 | A1* | 1/2019 | Wu | G05B 19/042 |
| 2020/0108203 | A1* | 4/2020 | Lamrani | G05B 13/042 |
| 2021/0039972 | A1* | 2/2021 | Kawata | C02F 3/006 |

* cited by examiner

INTELLIGENT CIRCULATION AND ALLOCATION CONTROL SYSTEM FOR MULTIPLE SURFACE AND GROUND WATER RESOURCES

CROSS-REFERENCE TO RELATED APPLICATIONS

This application claims priority to Chinese Application No. 202110567383.0, having a filing date of May 24, 2021, the entire contents of which are hereby incorporated by reference.

FIELD

The present invention belongs to the technical field of water resource pollution control, and particularly relates to a system and method for allocating and recycling water resources in shale gas exploitation.

BACKGROUND

Water used for shale gas exploitation mainly comes from four parts: surface water, ground water, water purchased from public sectors or private water supply places (hereinafter referred to as purchased water), and recycled water. Exploitation will not only consume a large amount of water resources, but lead to potential pollution of the water eco-environment. Its main pollutants include total suspended solids (TS), total organic carbon (TOC), calcium ions, magnesium ions, barium ions, bromine ions, etc. Therefore, it is important to improve a technology for circulating treatment of water resources, rationally plan the allocation of water resources and effectively manage limited water resources.

In general, the recycling of water resources in existing shale gas exploitation still has the following deficiencies and defects.

1. Traditional recycled water treatment mostly adopts a physicochemical method, and chemical agents are delivered in a reciprocated manner with the help of expensive mechanical equipment, so there are problems of incomplete treatment, great environmental damage, and high treatment cost. In addition, there are few coupled cheap and efficient biological treatment processes.

2. Most of them are only limited to treatment processes of flowback fluids. In the macroscopic water environment, the macro-control and treatment of various water sources used during the exploitation are not realized, and there is a lack of research on a water resource recycling system.

3. Intelligent water resource planning and allocation based on signal feedback and process control is almost a gap in the field of shale gas exploitation. Various water sources are not optimally allocated in combination with a current advanced artificial intelligence technology, and the water resources are not efficiently recycled. Moreover, water resource management and control are inefficient.

SUMMARY

An intelligent circulation and allocation control system for multiple surface and ground water resources provided by the present disclosure is based on an improved wastewater treatment process coupling physical, chemical and biological technologies and combined with an artificial intelligence technology to treat various water sources in a macroscopic water environment and optimize allocation control, so as to solve the technical problems of low efficiency of water resource recycling and difficulty in water resource management in shale gas exploitation.

The present disclosure provides an intelligent circulation and allocation control system for multiple surface and ground water resources, including a physical, chemical and biological multi-stage decentralized restoration system, wherein the physical, chemical and biological multi-stage decentralized restoration system is respectively connected with a water quality detection and reinjection system, an integrated data processing system, an intelligent safety early warning system, and an asynchronous and self-adaptive dual-regulation optimization control system; and the water quality detection and reinjection system is further connected with the intelligent safety early warning system, the intelligent safety early warning system is further connected with the integrated data processing system, and the integrated data processing system is further connected with the asynchronous and self-adaptive dual-regulation optimization control system.

The above physical, chemical and biological multi-stage decentralized restoration system is configured to restore various water sources (surface water, ground water, recycled water, and purchased water) required for shale gas exploitation; the water quality detection and reinjection system is configured to detect the water quality of the restored water resources (mainly the recycled water) and determine whether the water quality reaches the standards; the integrated data processing system is configured to monitor and collect information, such as water volumes, temperatures, and pH, of the various water sources in real time, process and feedback collected data and transmit the processed data to the asynchronous and self-adaptive dual-regulation optimization control system; the intelligent safety early warning system is configured to monitor and collect on-site image data and various safety information of the physical, chemical and biological multi-stage decentralized restoration system and the water quality detection and reinjection system, simulate an on-site operation scenario on line, timely give an early warning and handle various safety accidents and transmit important data to the integrated data processing system; and the asynchronous and self-adaptive dual-regulation optimization control system is configured to receive signal feedbacks transmitted from the integrated data processing system, combine the obtained data to perform optimized simulation and prediction of the water volumes and water quality of the various water resources and perform allocation control.

The above physical, chemical and biological multi-stage decentralized restoration system includes a recycled water collection device, a ground water collection device, a surface water collection device, and a purchased water collection device, and the recycled water collection device is sequentially connected with a two-phase gas floatation separator, a multi-stage membrane reverse filter tank, a pH regulator, an ozone aeration and jet reaction tower, a microbial filter tank, a heavy magnetic coagulation flocculation self-circulation device, a first sedimentation tank, and a mixing tank;

water outlet ends of the ground water collection device and the surface water collection device are sequentially connected with a first sand sedimentation tank, a coagulation reaction tank, a second sedimentation tank, and the mixing tank; and the purchased water collection device is sequentially connected with a second sand sedimentation tank and the mixing tank.

The above water quality detection and reinjection system includes a water quality detector and a standard water reinjection device, and the water quality detector is respectively connected with the mixing tank, the pH regulator, and the standard water reinjection device.

The above intelligent safety early warning system includes a main module, the main module includes a control device, and the main module is respectively connected with a face recognition module, a data communication module, a background monitoring module, a smoke alarm module, a pulse alarm module, an emergency handling module, and a voice broadcast module.

The above integrated data processing system includes a sensor, and an output end of the sensor is sequentially connected with a data collector, an analog-to-digital converter, and a data processing center; and the sensor has an input end connected with the physical, chemical and biological multi-stage decentralized restoration system and the output end connected with an input end of the asynchronous and self-adaptive dual-regulation optimization control system, and the sensor is configured to monitor the pH, temperatures, electrical conductivity, water volumes, dissolved oxygen, biochemical oxygen demands, and gas outputs at each moment of the collected water sources.

The asynchronous and self-adaptive dual-regulation optimization control system includes a data input device, an output end of the data input device is respectively connected with a first error regulator, a multi-modal integrated simulation and prediction device, an automatic anti-noise compensation controller, and a multi-objective decision optimizer, an output end of the multi-modal integrated simulation and prediction device is connected with the first error regulator, and an output end of the first error regulator is connected with an input end of the multi-objective decision optimizer;

an output end of the multi-objective decision optimizer is respectively connected with the multi-modal integrated simulation and prediction device and a first input end of a second error regulator, and a second input end of the second error regulator is connected with the output end of the multi-modal integrated simulation and prediction device; an output end of the second error regulator is connected with the automatic anti-noise compensation controller; and an output end of the automatic anti-noise compensation controller is connected with an input end of a water volume regulation allocator, and an output end of the water volume regulation allocator is respectively connected with a recycled water flow control valve of the recycled water collection device, a ground water flow control valve of the ground water collection device, a surface water flow control valve of the surface water collection device, and a purchased water flow control valve of the purchased water collection device.

During use, a workflow of the asynchronous and self-adaptive dual-regulation optimization control system is specifically as follows:

the data input device takes data such as water volume, biological oxygen demand (BOD), and chemical oxygen demand (COD) transmitted by the data processing center at a moment t as an input variable x(t) and data such as gas outputs, greenhouse gas (GHG) emissions, and water consumptions at the moments t−1 and t as an optimized objective variable y(t−1), and inputs y(t) to the multi-modal integrated simulation and prediction device, the automatic anti-noise compensation controller, the multi-objective decision optimizer, and the corresponding error regulator;

the multi-modal integrated simulation and prediction device adopts a multi-layer stacking model integration framework, wherein a first layer includes a plurality of base learners, i.e., a random forest (RF), a support vector machine (SVM), a gradient-boosted decision tree (GBDT), and an extreme gradient boosting (XGB) algorithm, the input variable x(t), the historical optimized objective variable y(t−1), and an optimized decision variable u'(t) serve as an original training set, a second layer of model adds outputs of the base learners of the first layer as features to the original training set for retraining to obtain a training set thereof, until a final layer obtains a complete stacking model, and a simulated and predicted value $y_p(t),u_p(t)$ is output; and the multi-objective decision optimizer optimizes the gas output, the GHG emission, and the water consumption by using a nondominated sorting genetic algorithm II (NSGA-II), receives x(t) and $e_y(t)$ transmitted from the data input device and the corresponding error regulator, outputs the instantaneous optimized decision variable u'(t) to the multi-modal integrated simulation and prediction device, and continuously regulates feedbacks to obtain an optimal decision variable u*(t), wherein constraint conditions involve many aspects such as technologies, environments, and nature.

The present disclosure further provides an optimization method of the multi-objective decision optimizer, including the following steps:

step 1: building a multi-objective function decision optimization model, i.e., a shale gas-environment-water resource model, wherein the multi-objective function decision optimization model includes an efficient shale gas production module, a GHG emission control module, and a water resource conservation module;

step 2: setting model parameters and constraint values;

step 3: solving, by using the NSGA-II, the multi-objective function decision optimization model;

step 4: obtaining optimal Pareto frontiers, and selecting, by a decision maker, a satisfactory solution from a Pareto frontier list.

In the step 1, the multi-objective function decision optimization model includes an upper layer of the efficient shale gas production module, a middle layer of the GHG emission control module, and a lower layer of the water resource conservation module, and the multi-objective function decision optimization model is specifically as follows:

1) an optimization objective of the upper layer of the efficient shale gas production module is to maximize a shale gas output, the shale gas output is in line with an exponentially decreasing trend, a decreasing rate D is introduced, and the constraint of a single-well gas output, the exploitation scale, the constraint of a drilled well quantity, etc. are taken into account;

$$\begin{cases} \max P_G = \sum_{j=1}^{40} P_{well,j} P_{g,j} e^{-D_j t_j} \\ P_g\text{Min} \le P_{g,j} \le P_g\text{Max} \\ P_{well}\text{Min} \le P_{well,j} \le P_{well}\text{Max} \\ D_{min} \le D_j \le D_{max} \end{cases}$$

wherein subscript i denotes the type of freshwater resource (i=1 represents the surface water, i=2 represents the ground water, i=3 represents the purchased water, and i=4 represents the recycled water), and subscript j denotes a planning period, wherein 10a is selected as a planning period and each quarter is taken as a planning unit (i.e., the planning period j=1, 2, 3, 40);

$P_G$ denotes the total shale gas output in the planning period, the unit thereof is bcf;

$P_{well}$ denotes the drilled well quantity in kou;

$P_g$ denotes the single-well shale gas output in bcf;

D denotes the decreasing rate of the shale gas output;

$D_{min}$ denotes the decreasing rate of the minimum shale gas output;

$D_{max}$ denotes the decreasing rate of the maximum shale gas output;

t denotes actual production time in a planning unit, the unit thereof is h;

$P_G$Min denotes the minimum shale gas output in the planning period, the unit thereof is gal;

$P_G$Max denotes the maximum shale gas output in a life cycle, the unit thereof is gal;

$P_{well}$Min denotes the minimum drilled well quantity in kou; and $P_{well}$Max denotes the maximum drilled well quantity in kou;

2) an optimization objective of the middle layer of the GHG emission control module is to minimize the GHG emission, and environmental constraints are taken into account;

$$\begin{cases} \min T_{GHG} = \sum_{i=1}^{4}\sum_{j=1}^{40} P_{water,i,j}D_{F,i,j}E_{F,i,j} + \sum_{j=1}^{40} P_{well,j}E_{well,j} + \sum_{j=1}^{40} P_{G,j}E_{G,i} + \sum_{j=1}^{40} W_{tc,j}D_{C,j}E_{C,j} + \sum_{j=1}^{40} W_{td,j}D_{Z,j}E_{Z,j} \\ T_{GHG} \le \sum_{j=1}^{40} T_{GHG,j}\,\mathrm{Max} \end{cases}$$

$T_{GHG}$ denotes the total greenhouse gas emission in the planning period, the unit thereof is kg;

$P_{water}$ denotes the freshwater resource supply in gal;

$D_F$ denotes the distance between freshwater resource and a gas production zone, the unit thereof is km;

$E_F$ denotes the greenhouse gas emission intensity of freshwater resource per unit of transport, the unit thereof is kg/(km·gal);

$E_{well}$ denotes the greenhouse gas emission intensity during drilling and hydraulic fracturing of single well, the unit thereof is kg;

$E_G$ denotes the greenhouse gas emission intensity during gas production per unit, the unit thereof is kg/bcf;

$W_{tc}$ denotes the wastewater treatment amount of a compact wastewater treatment system (CWT), the unit thereof is gal;

$D_C$ denotes the average distance between the CWT and the gas production zone, the unit thereof is km;

$E_C$ denotes the greenhouse gas emission intensity of wastewater per treatment unit of the CWT, the unit thereof is kg/(km·gal);

$W_{td}$ denotes the wastewater treatment amount of an injection well, the unit thereof is gal;

$D_Z$ denotes the average distance between the injection well and the gas production zone, the unit thereof is km;

$E_Z$ denotes the greenhouse gas emission intensity of wastewater per treatment unit of the injection well, the unit thereof is kg/(km·gal); and $T_{GHG}$Max denotes the maximum allowable greenhouse gas emission in kg; and 3) an optimization objective of the lower layer of the water resource conservation module is to minimize the water consumption, and the constraints of water supply and demand, and capacity constraints of equipment such as a CWT, the injection well, and on-site treatment equipment are taken into account;

$$\begin{cases} \mathrm{Min}T_{WC} = \sum_{i=1}^{4}\sum_{j=1}^{40} P_{water,i,j} - \sum_{j=1}^{40} W_{tc,j} - \sum_{j=1}^{40} W_{td,j} - \sum_{j=1}^{40} W_{to,j} \\ P_{water,i,j}\mathrm{Min} \le \sum_{i=1}^{4}\sum_{j=1}^{40} P_{water,i,j} \le P_{water,i,j}\mathrm{Max} \\ \sum_{i=1}^{4}\sum_{j=1}^{40} W_{tc,i,j} \le W_{tc,i,j}\mathrm{Max} \\ \sum_{i=1}^{4}\sum_{j=1}^{40} W_{td,i,j} \le W_{td,i,j}\mathrm{Max} \\ \sum_{i=1}^{4}\sum_{j=1}^{40} W_{to,i,j} \le W_{to,i,j}\mathrm{Max} \end{cases}$$

$T_{WC}$ denotes the water consumption of a shale gas supply system, the unit thereof is gal;

$P_{water}$Min denotes the minimum supply of freshwater resource, the unit thereof is gal;

$P_{water}$Max denotes the maximum supply of freshwater resource, the unit thereof is gal;

$W_{to}$ denotes the on-site wastewater treatment amount in gal;

$W_{tc}$Max denotes the maximum treatment capacity of the CWT, the unit thereof is gal;

$W_{td}$ Max denotes the maximum treatment capacity of the injection well, the unit thereof is gal; and $W_{td}$Max denotes the maximum on-site treatment capacity in gal.

Compared with the prior art, the present disclosure has the following technical effects.

1) The present disclosure improves a process flow of a traditional physicochemical method for recycled water treatment, couples a cheap and efficient biomembrane method, realizes the macro-control and treatment of various water sources during the exploitation in the macroscopic water environment, and makes a complete analysis on a water resource recycling system.

2) The present disclosure provides a technical solution of intelligent optimization control based on integrated prediction and NSGA-II, fills a gap based on signal feedback and process control in the field of shale gas exploitation in China, and effectively improves the optimal allocation of water resources.

3) According to the present disclosure, in the asynchronous and self-adaptive dual-regulation optimization control system, the automatic anti-noise compensation controller is designed, which effectively enhances the automatic anti-noise property and self-adaptability of the system. An asynchronous processing and dual-error signal feedback regulation mechanism is designed, which greatly improves the prediction accuracy and feedback regulation sensitivity of the system.

BRIEF DESCRIPTION OF THE DRAWINGS

The present disclosure is further described below with reference to the accompanying drawings and embodiments.

DETAILED DESCRIPTION

Figure 1:
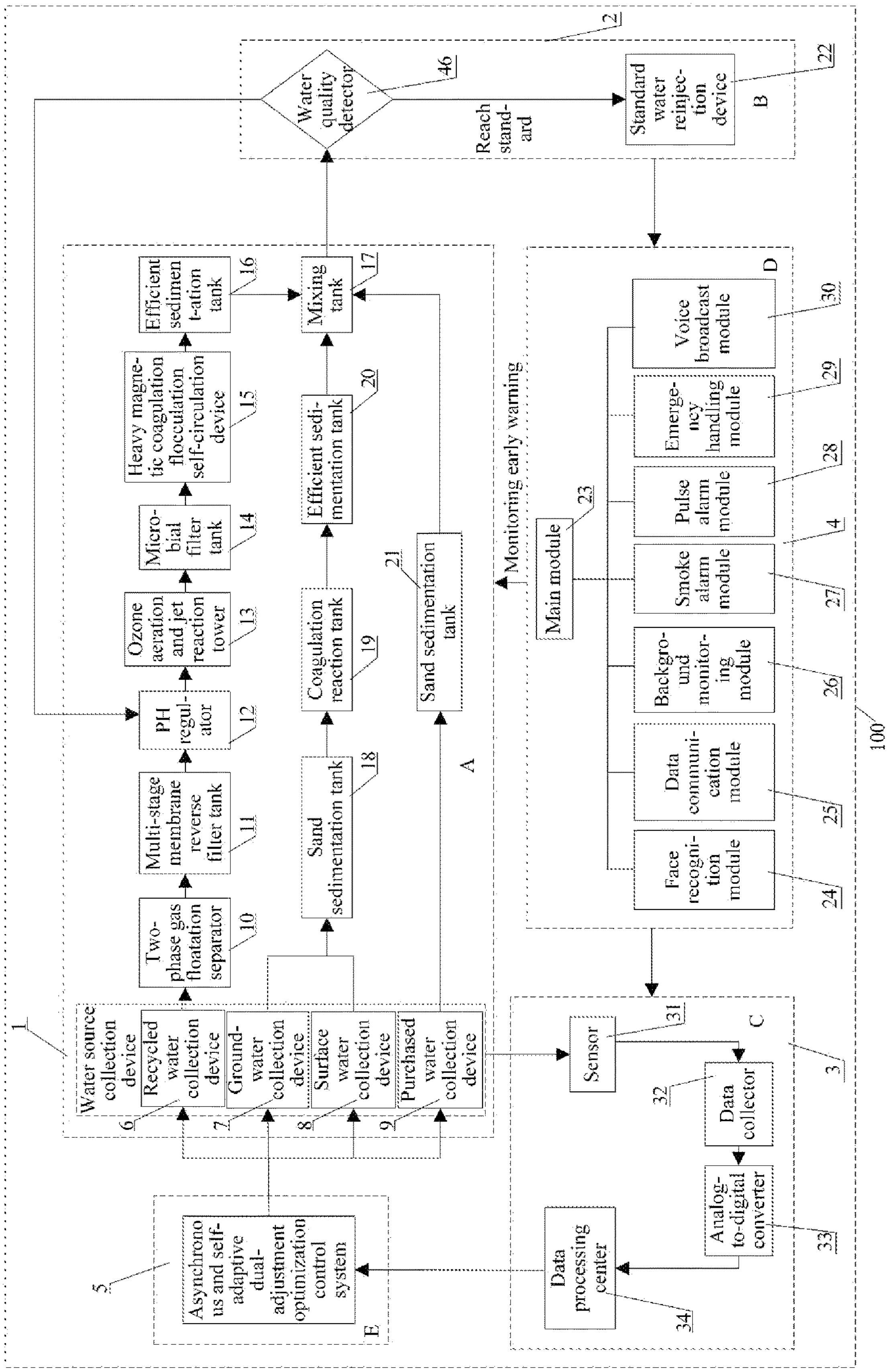
FIG. 1 is a schematic diagram of a structure of a system provided by the present disclosure.

As shown in FIG. 1, an intelligent circulation and allocation control system 100 for multiple surface and ground water resources, including a physical, chemical and biological multi-stage decentralized restoration system 1, wherein the physical, chemical and biological multi-stage decentralized restoration system 1 is respectively connected with a water quality detection and reinjection system 2, an integrated data processing system 3, an intelligent safety early warning system 4, and an asynchronous and self-adaptive dual-regulation optimization control system 5.

The water quality detection and reinjection system 2 is further connected with the intelligent safety early warning system 4, the intelligent safety early warning system 4 is further connected with the integrated data processing system 3, and the integrated data processing system 3 is further connected with the asynchronous and self-adaptive dual-regulation optimization control system 5.

The physical, chemical and biological multi-stage decentralized restoration system 1 is configured to restore various water sources (surface water, ground water, recycled water, and purchased water) required for shale gas exploitation; the water quality detection and reinjection system 2 is configured to detect the water quality of the restored water resources (mainly the recycled water) and determine whether the water quality reaches the standards; the integrated data processing system 3 is configured to monitor and collect information, such as water volumes, temperatures, and pH, of the various water sources in real time, process and feedback collected data and transmit the processed data to the asynchronous and self-adaptive dual-regulation optimization control system 5; the intelligent safety early warning system 4 is configured to monitor and collect on-site image data and various safety information of the physical, chemical and biological multi-stage decentralized restoration system 1 and the water quality detection and reinjection system 2, simulate an on-site operation scenario on line, timely give an early warning and handle various safety accidents and transmit important data to the integrated data processing system 3; and the asynchronous and self-adaptive dual-regulation optimization control system 5 is configured to receive signal feedbacks transmitted from the integrated data processing system 3, combine the obtained data to perform optimized simulation and prediction of the water volumes and water quality of the various water resources and perform allocation control.

The physical, chemical and biological multi-stage decentralized restoration system 1 includes a recycled water collection device 6, a ground water collection device 7, a surface water collection device 8, and a purchased water collection device 9, and the recycled water collection device 6 is sequentially connected with a two-phase gas floatation separator 10, a multi-stage membrane reverse filter tank 11, a pH regulator 12, an ozone aeration and jet reaction tower 13, a microbial filter tank 14, a heavy magnetic coagulation flocculation self-circulation device 15, a first sedimentation tank 16, and a mixing tank 17.

Water outlet ends of the ground water collection device 7 and the surface water collection device 8 are sequentially connected with a first sand sedimentation tank 18, a coagulation reaction tank 19, a second sedimentation tank 20, and the mixing tank 17.

The purchased water collection device 9 is sequentially connected with a second sand sedimentation tank 21 and the mixing tank 17.

Figure 2:
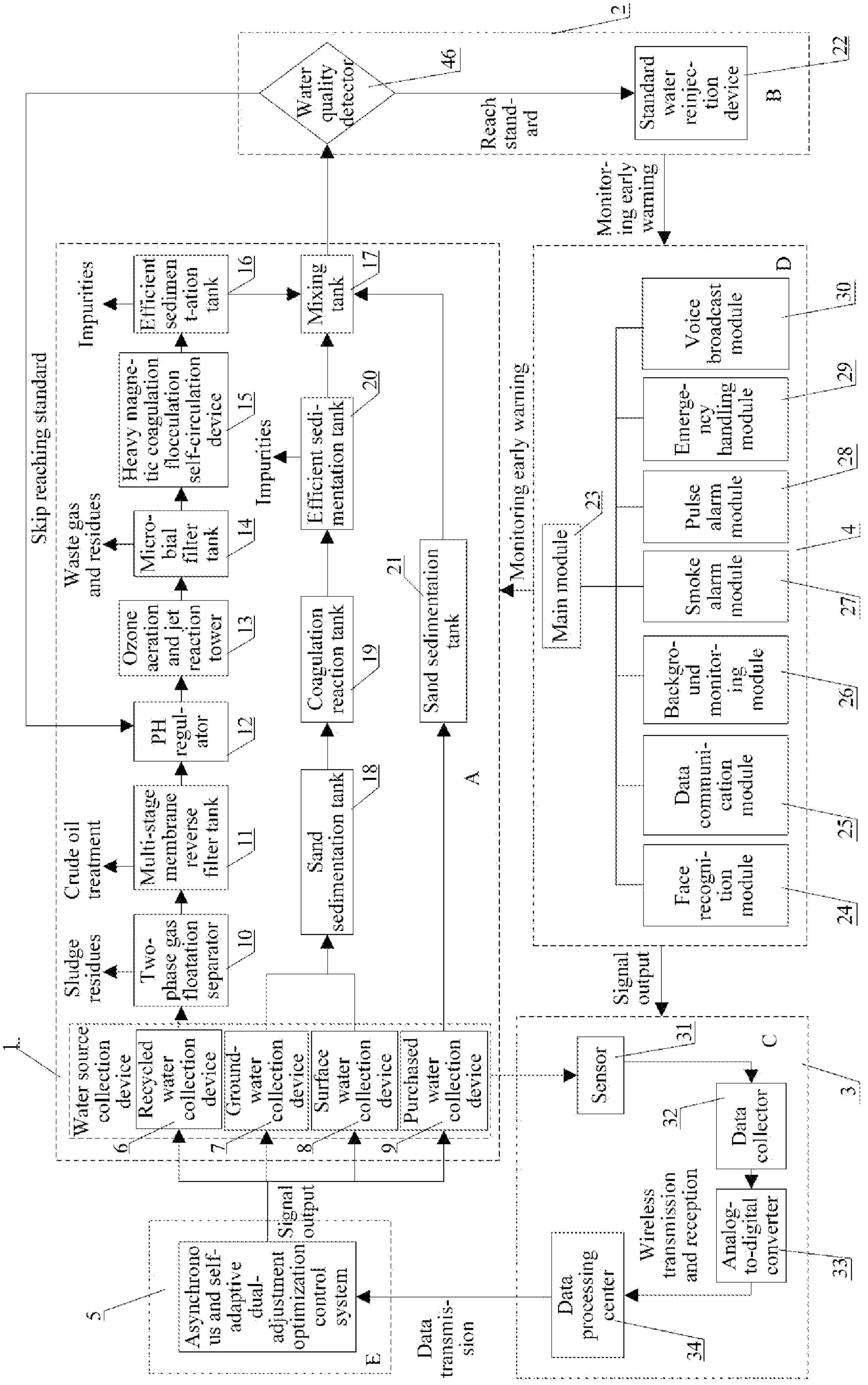
FIG. 2 is a general schematic block diagram of the structure of the system provided by the present disclosure.

As shown in FIG. 2, a workflow of the asynchronous and self-adaptive dual-regulation optimization control system is as follows.

Since impurity compositions of the recycled water are most complex, its restoration process and corresponding restoration device are also major difficulties of this restoration treatment subsystem. The freshwater resources such as the surface water, the ground water, the recycled water, and the purchased water are collected into the surface water collection device, the ground water collection device, the recycled water collection device, and the purchased water collection device by different means (pipelines, truck transportation, etc.); the recycled water passes through the two-phase gas floatation separator to remove sludge impurities, and after sludge removal, the recycled water enters the multi-stage membrane reverse filter tank to further separate crude oil and water; subsequently, the recycled water flows into the pH regulator to regulate a pH value, after the pH on a display screen is suitable, the recycled water enters the ozone aeration and jet reaction tower for preoxidation treatment, and after an appropriate oxidation environment is achieved, the recycled water enters the microbial filter tank to remove biological oxygen demand (BOD), chemical oxygen demand (COD), and ammonia and nitrogen organic matter in wastewater through an aerobic microbial membrane and an anaerobic microbial membrane respectively; after microbial degradation, the recycled water flows into the heavy magnetic coagulation flocculation self-circulation device, and a coagulant, a coagulant aid, a flocculant, and magnetic powder are added for flocculation and sedimentation treatment to remove suspended matter and impurity ions in a liquid phase; the water is discharged and then enters the efficient sedimentation tank to separate solid and liquid, so as to obtain clear water; the surface water and the ground water first enter the sand sedimentation tank to remove silts, sand grains, and other particulate matter carried in the water, and a supernatant liquid enters the coagulation tank through a pipeline for coagulation flocculation treatment, and then enters the sedimentation tank to remove the impurity ions in the water; the purchased water directly enters the sand sedimentation tank to sediment solid impurities; and the above four water sources directly enter the mixing tank after being treated, so that the water quality is more uniform, the detection is facilitated, and the cost is saved.

Further, for the physical, chemical and biological multi-stage decentralized restoration system 1, the physical, chemical and biological multi-stage decentralized restoration system 1 adopts a multi-stage treatment process coupling first-stage physical treatment, second-stage biological treatment, and third-stage chemical treatment methods, and waste liquid and residues discharged from each process step may be used by secondary treatment. Compared with a traditional chemical or physical method, the present disclosure has the advantages that the pollution to the environment is greatly reduced, the treatment is thorough, and the cost is effectively reduced. Devices including the restoration system are all movable modular devices installed in a decentralized manner, which not only save space, but may be scientifically assembled according to different water quality requirements and treatment requirements; and the operation is convenient and flexible, which greatly improves the work efficiency. The physical, chemical and biological multi-stage decentralized restoration system includes water source collection devices, sequentially including the surface water collection device, the ground water collection device, the recycled water collection device, and the purchased water collection device, which collect the various water sources used for shale gas exploitation by mainly using the pipelines; the two-phase gas floatation separator, which is connected with the recycled water collection device to separate sludge residues in the water; the multi-stage membrane reverse filter tank, which is configured to perform staged filtration to intercept oily macromolecules and rapidly separate the oil and the water in the liquid phase; the pH regulator, which is equipped with a pH meter to indicate and regulate the pH value; the ozone aeration and jet reaction tower, which is configured to perform preoxidation treatment, so as to create a growth environment that is easy for microbial metabolism and degradation of the organic matter; the microbial filter tank, which is configured to cultivate special effective aerobic and anaerobic microorganisms, so as to efficiently degrade the ammonia and nitrogen organic matter in the wastewater and reduce the values of BOD and COD; the heavy magnetic coagulation flocculation self-circulation device, which is configured to add the coagulant, the coagulant aid, the flocculant, and the heavy magnetic powder and automatically add a filler to strengthen the sedimentation and make the fine impurity ions form floccules to be sunken and separated; the efficient sedimentation tank, which is configured to remove the impurities such as the sand grains and chemical sediments in the water; the sand sedimentation tank, which is configured to perform pretreatment to remove coarse particles such as the silts in incoming water; and the mixing tank, which is configured to fully mix the various water sources after treatment, so as to make the effluent water quality more uniform and easy to monitor.

The multi-stage membrane reverse filter tank 11 includes a first-stage coarse filtration membrane, a second-stage microfiltration membrane, and a third-stage fine filtration membrane, which are connected in sequence. The first-stage coarse filtration membrane is prepared from a porous $Al_2O_3$ ceramic material and configured to filter suspended oil contaminants with a particle size of greater than 100 μm in oily wastewater; the second-stage microfiltration membrane is prepared from a polypropylene organic polymeric material and configured to remove dispersed oil contamination with a particle size of 10-100 μm in coarsely filtered wastewater; and as an improvement of the present disclosure, the third-stage fine filtration membrane is a novel polyamide polymer composite membrane coupling ultrafiltration and reverse osmosis (for example, a polyamide reverse osmosis composite membrane disclosed in Chinese Patent Publication No. CN104607066A), which effectively improves the interception efficiency of oily micromolecules with a particle size of less than 10 μm. As an improvement of the present disclosure, the multi-stage membrane reverse filter tank is equipped with a fully-automatic membrane tank cleaner, which is controlled by a programmable logic controller (PLC) system to clean the membrane tank in all directions on line, so as to reduce the problems such as blockage and flowback caused by macromolecular contaminants and improve the separation efficiency.

The ozone aeration and jet reaction tower 13 includes three parts: an ozone pressure pump, an aeration chamber, and a jet device (for example, an efficient ozone catalytic oxidation reaction integration device disclosed in Chinese Patent Publication No. CN214400042U; and a novel water and gas circulation ozone reaction device disclosed in Chinese Patent Publication No. CN208200488U). The ozone pressure pump is configured to perform suction by applying a high pressure to ozone in a pipeline. The aeration chamber connected with the ozone pressure pump is configured to accommodate the treated wastewater, so as to make it in full contact with high-pressure gas. As an improvement of the present disclosure, a cavity is formed in the aeration chamber and communicates with outside air to achieve a repeated self-suction effect. As an improvement of the present disclosure, a dissolved oxygen (DO) detection probe is installed outside the jet device, and a jet angle may be arbitrarily regulated according to a detection result to change a jet velocity, so as to achieve optimal preoxidation.

The microbial filter tank 14 includes an aerobic microbial membrane tank and an anaerobic microbial membrane tank (for example, a microbial filter tank disclosed in Chinese Patent Publication No. CN205294965U; and an aerobic/anaerobic biological filter tank disclosed in Chinese Patent Publication No. CN105540841A), which are connected in sequence. The aerobic microbial membrane tank is continuously filled with oxygen, the cultivated microorganisms are mainly zoogloeae, and there are also a small amount of algae, sphaerotilus natans, etc.; and the microorganisms cultivated in the anaerobic microbial membrane tank are mainly bacteria such as bacteroides and streptococci, which perform secondary treatment on waste residues treated with the aerobic microorganisms. As an improvement of the present disclosure, biogas produced after anaerobic microbial metabolism is configured as power supply fuel of the system, and the generated waste residues are rich in a variety of nutrients, which may be recycled to cultivate the microorganisms.

The heavy magnetic coagulation flocculation self-circulation device 15 includes an intelligent feeder (for example, an intelligent feeding system for magnetic powder disclosed in Chinese Patent Publication No. CN210885452U), a magnetic coagulation flocculation reaction tank, and a recycling device for magnetic powder (for example, a recycling device for magnetic powder in a magnetic coagulation flocculation system disclosed in Chinese Patent Publication No. CN214570939U). As an improvement of the present disclosure, the intelligent feeder is internally equipped with an ultrasonic sensor to monitor a feeding ratio in real time, and the ratio is automatically regulated by using the PLC system for feeding. As an improvement of the present disclosure, the fed magnetic powder has good separation performance and magnetic biochemical effect, and has the advantages of low agent consumption, short residence time, and small occupied area. As an improvement of the present disclosure, the recycling device for the magnetic powder is equipped with a hydraulic suction pump and a super-magnetic separator to efficiently recover and rapidly separate magnetic powder polymers, which are transmitted to the intelligent feeder through a pipeline.

The water quality detection and reinjection system 2 includes a water quality detector 46 and a standard water reinjection device 22, and the water quality detector 46 is respectively connected with the mixing tank 17, the pH regulator 12, and the standard water reinjection device 22.

Further, the water quality detection and reinjection system 2 includes the water quality detector 46 and the standard water reinjection device 22, and the water quality detector 46 is respectively connected with the mixing tank 17, the pH regulator 12, and the standard water reinjection device 22.

For the water quality detection and reinjection system 2, the water quality detection and reinjection system 2 includes the water quality detector, which detects the treated water source in the mixing tank, if the water quality meets the reinjection standard, the water source is introduced into the reinjection device through a pipeline, and if the water quality does not meet the standard, the water source is delivered to the pH regulator to continue treatment until the standard is reached; and the standard water reinjection device is connected to the water quality detector and configured to accommodate the standard reinjected water.

Further, the intelligent safety early warning system 4 includes a main module 23, the main module 23 includes a control device, and the main module 23 is respectively connected with a face recognition module 24, a data communication module 25, a background monitoring module 26, a smoke alarm module 27, a pulse alarm module 28, an emergency handling module 29, and a voice broadcast module 30.

The intelligent safety early warning system 4 mainly uses a PLC technology, and includes the main module, which is configured to monitor other subordinate modules and receive information from other modules by using wireless communication; the face recognition module, which includes a face recognizer, a keyboard, and other components, and is configured to provide two ways of passing of face recognition and keyboard-based password input; the background monitoring module, which is configured to monitor a virtual platform on line by using a B/S technology architecture, intelligently simulate each processing operation step, collect important parameter information and arrange cameras at key points to monitor the site in real time; the data communication module, which is configured to construct a wireless general packet radio service (GPRS) local area network, so as to achieve wireless communication; the smoke alarm module, which is provided with multiple sets of smoke detectors and alarms in a wastewater restoration workshop to monitor the concentration of harmful dangerous gases such as carbon dioxide, methane, and nitrogen oxides in the air and timely give an alarm when the concentration exceeds a set threshold; the pulse alarm module, which is installed with electronic pulse fences at the key points to effectively prevent illegal invasion of the outside; the voice broadcast module, which is configured to broadcast an emergency notification in all directions for timely prevention and frequently play an alarm voice for deterring illegal invaders; and the emergency handling module, which is configured to automatically recognize a hazard level of the system and timely take first, second and third-level response measures according to the divided levels, so as to ensure the overall safe operation of the system.

Further, the integrated data processing system 3 includes a sensor 31, and an output end of the sensor 31 is sequentially connected with a data collector 32, an analog-to-digital converter 33, and a data processing center 34; and the sensor 31 has an input end connected with the physical, chemical and biological multi-stage decentralized restoration system 1 and the output end connected with an input end of the asynchronous and self-adaptive dual-regulation optimization control system 5, and the sensor 31 is configured to monitor the pH, temperatures, electrical conductivity, water volumes, dissolved oxygen, biochemical oxygen demands, and gas outputs at each moment of the collected water sources. The analog-to-digital converter, i.e., the A/D converter, is configured to convert analog signals of key index parameters input by the sensor into digital signals; the data collector is configured to collect, store, and back up real-time data monitored by each sensor; and the integrated data processing center is configured to collect digital signals of transmitted parameter data of the water source by transmitting and receiving wireless signals and process and correct them according to historical parametric statistics.

Specifically, the data monitored by the sensors are collected, stored, and backed up by the data collector; and the analog signals of the transmitted data are converted into the digital signals by the analog-to-digital converter, and the digital signals are transmitted by wireless transmission and reception to the data processing center for correction and processing, so as to reduce the influence of errors generated in the process of data collection and transmission on actual data.

Further, the asynchronous and self-adaptive dual-regulation optimization control system 5 includes a data input device 35, an output end of the data input device 35 is respectively connected with a first error regulator 36, a multi-modal integrated simulation and prediction device 37, an automatic anti-noise compensation controller 38, and a multi-objective decision optimizer 39, an output end of the multi-modal integrated simulation and prediction device 37 is connected with the first error regulator 36, and an output end of the first error regulator 36 is connected with an input end of the multi-objective decision optimizer 39.

An output end of the multi-objective decision optimizer 39 is respectively connected with the multi-modal integrated simulation and prediction device 37 and a first input end of a second error regulator 40, and a second input end of the second error regulator 40 is connected with the output end of the multi-modal integrated simulation and prediction device 37; an output end of the second error regulator 40 is connected with the automatic anti-noise compensation controller 38.

An output end of the automatic anti-noise compensation controller 38 is connected with an input end of a water volume regulation allocator 41, and an output end of the water volume regulation allocator 41 is respectively connected with a recycled water flow control valve 42 of the recycled water collection device 6, a ground water flow control valve 43 of the ground water collection device 7, a surface water flow control valve 44 of the surface water collection device 8, and a purchased water flow control valve 45 of the purchased water collection device 9.

Figure 3:
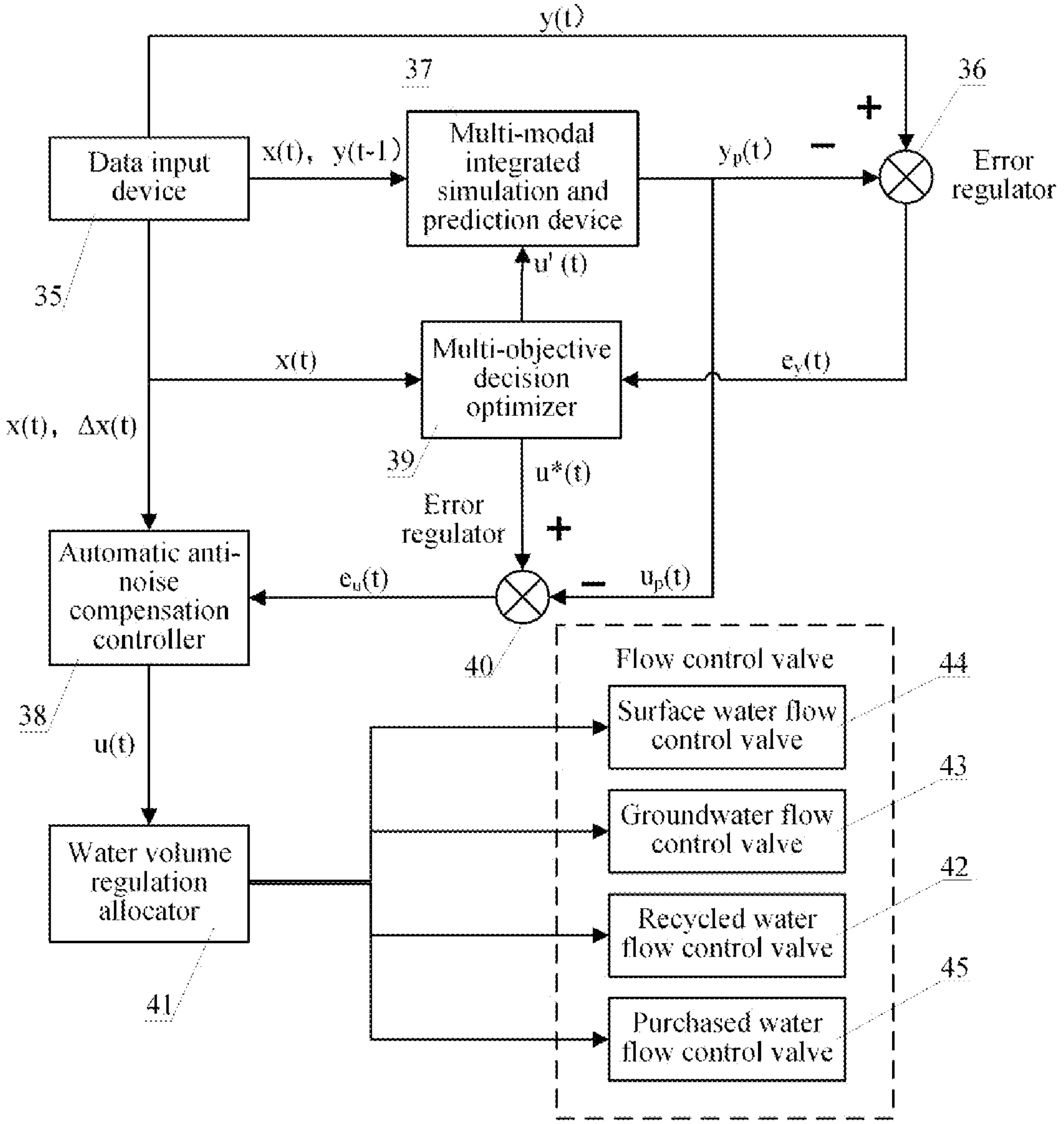
FIG. 3 is a schematic block diagram of a structure of an asynchronous and self-adaptive dual-regulation optimization control system in the present disclosure.

More specifically, as shown in FIG. 3, the asynchronous and self-adaptive dual-regulation optimization control system 5 includes the data input device 35, the multi-modal integrated simulation and prediction device 37, the multi-objective decision optimizer, the two error regulators, the automatic anti-noise compensation controller, and the water volume regulation allocator. Internal input end and receiving end of the asynchronous and self-adaptive dual-regulation optimization control system may achieve asynchronous processing. If a current thread is blocked, subsequent threads are allowed to be executed, i.e., signal output of the receiving end is not affected by end of signal transmission of the input end. The automatic anti-noise compensation controller is configured to perform compensation control for the parameter uncertainty caused by an observation time difference, position change and other external adverse disturbances on the basis of existing proportional integral (PI) regulation, and has good anti-noise, robust and self-adaptive characteristics. Predicted values of a decision variable u(t) and an optimized objective variable y(t) are respectively corrected by using the two error regulators to achieve feedback dual-regulation, and compared with traditional single error regulation for the decision variable only, the dual-regulation has the advantages that the prediction accuracy of the system is greatly improved and the fault tolerance rate of the system is enhanced.

During use, a workflow of the asynchronous and self-adaptive dual-adjustment optimization control system 5 is specifically as follows.

The data input device 35 takes data such as water volume, biological oxygen demand (BOD), and chemical oxygen demand (COD) transmitted by the data processing center 34 at a moment t as an input variable x(t) and data such as gas outputs, greenhouse gas (GHG) emissions, and water consumptions at the moments t−1 and t as an optimized objective variable y(t−1), and inputs y(t) to the multi-modal integrated simulation and prediction device, the automatic anti-noise compensation controller, the multi-objective decision optimizer, and the corresponding error regulator.

The multi-modal integrated simulation and prediction device 37 adopts a multi-layer stacking model integration framework, wherein a first layer includes a plurality of base learners, i.e., a random forest (RF), a support vector machine (SVM), a gradient-boosted decision tree (GBDT), and an extreme gradient boosting (XGB) algorithm, the input variable x(t), the historical optimized objective variable y(t−1), and an optimized decision variable u'(t) serve as an original training set.

For example: 10,000 samples are called from the data processing center to serve as a data set, 2,500 samples serve as a test set, and the data set is divided into 5 parts, each with 2,000 samples. Training samples are respectively predicted, and then predicted results serve as training samples of a next layer.

For example, for a first model RF, the data set is first divided into the 5 parts:

1,2,3,4,5. There are steps as follows:

1. 2, 3, 4, and 5 are retained for training, 1 is used as test data, a predicted result of the test data of this part is recorded, and meanwhile, the test set is predicted;

2. 1, 3, 4, and 5 are retained for training, 2 is used as test data, a predicted result of the test data of this part is recorded, and the test set is predicted;
3. 1, 2, 4, and 5 are retained for training, 3 is used as test data, a predicted result of the test data of this part is recorded, and the test set is predicted;
4. 1, 2, 3, and 5 are retained for training, 4 is used as test data, a predicted result of the test data of this part is recorded, and the test set is predicted;
5. 1, 2, 3, and 4 are retained for training, 5 is used as test data, a predicted result of the test data of this part is recorded, and the test set is predicted;

five predicted values for the test set are obtained after five rounds of training, an average value is taken, and the predicted results of all models for the training data set are spliced;

next, the SVM, the GBDT, and the XGB are trained in the same way, and after training of all, the obtained four predicted results are brought into the next layer for prediction;

a second layer of model adds outputs of the base learners of the first layer as features to the original training set for retraining to obtain a training set thereof (a logistic regression (LR) model is used in order to prevent overfitting, and the four predicted results are spliced to a real label of each sample and are brought into the models for training), until a final layer obtains a complete stacking model, and a simulated and predicted value $y_p(t)$, up(t) is output; and the multi-objective decision optimizer optimizes the gas output, the GHG emission, and the water consumption by using a nondominated sorting genetic algorithm II (NSGA-II), receives x(t) and $e_y(t)$ transmitted from the data input device and the corresponding error regulator, outputs the instantaneous optimized decision variable u'(t) to the multi-modal integrated simulation and prediction device, and continuously regulates feedbacks to obtain an optimal decision variable u*(t), wherein constraint conditions involve many aspects such as technologies, environments, and nature.

Figure 4:
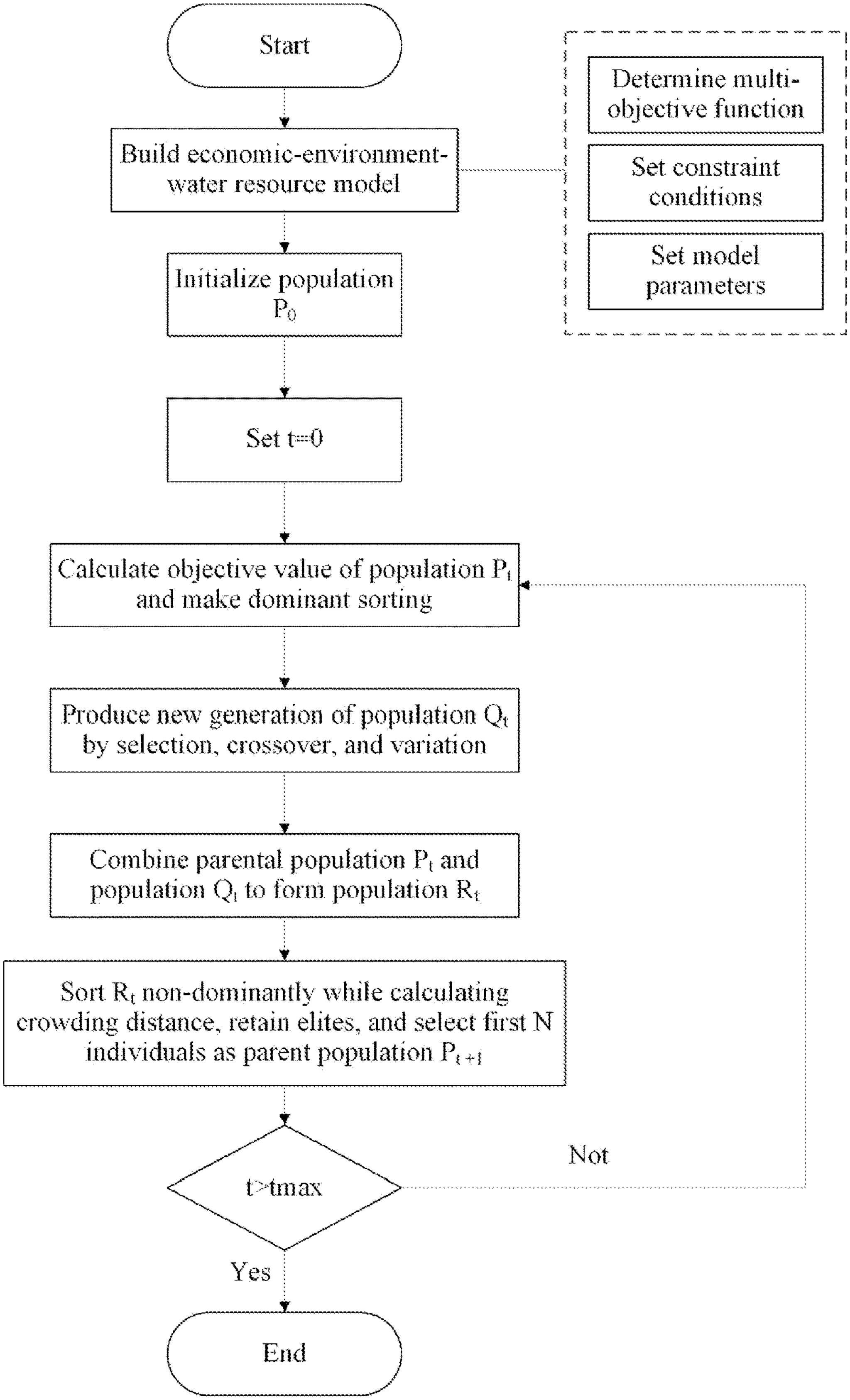
FIG. 4 is an optimization flowchart of a multi-objective decision optimizer in the present disclosure.

As shown in FIG. 4, the flow of optimizing multiple objectives such as the gas output, the GHG emission, and the water consumption by using the NSGA-II is as follows.

Step 1: a multi-objective function decision optimization model (shale gas-environment-water resource model) is built. The multi-objective function decision optimization model includes an efficient shale gas production module, a GHG emission control module, and a water resource conservation module.

The multi-objective function decision optimization model includes an upper layer of the efficient shale gas production module, a middle layer of the GHG emission control module, and a lower layer of the water resource conservation module, and the multi-objective function decision optimization model is specifically as follows.

1. An optimization objective of the upper layer of the efficient shale gas production module is to maximize a shale gas output, the shale gas output is in line with an exponentially decreasing trend, a decreasing rate D is introduced, and the constraint of a single-well gas output, the exploitation scale, the constraint of a drilled well quantity, etc. are taken into account.

$$\begin{cases} \max P_G = \sum_{j=1}^{40} P_{well,j} P_{g,j} e^{-D_j t_j} \\ P_g\mathrm{Min} \le P_{g,j} \le P_g\mathrm{Max} \\ P_{well}\mathrm{Min} \le P_{well,j} \le P_{well}\mathrm{Max} \\ D_{min} \le D_j \le D_{max} \end{cases}$$

wherein subscript i denotes the type of freshwater resource (i=1 represents the surface water, i=2 represents the ground water, i=3 represents the purchased water, and i=4 represents the recycled water), and subscript j denotes a planning period, wherein 10a is selected as a planning period and each quarter is taken as a planning unit (i.e., the planning period j=1, 2, 3, 40);

$P_G$ denotes the total shale gas output in the planning period, the unit thereof is bcf;

$P_{well}$ denotes the drilled well quantity in kou;

$P_g$ denotes the single-well shale gas output in bcf;

D denotes the decreasing rate of the shale gas output;

$D_{min}$ denotes the decreasing rate of the minimum shale gas output;

$D_{max}$ denotes the decreasing rate of the maximum shale gas output;

t denotes actual production time in a planning unit, the unit thereof is h;

$P_G$Min denotes the minimum shale gas output in the planning period, the unit thereof is gal;

$P_G$Max denotes the maximum shale gas output in a life cycle, the unit thereof is gal;

$P_{well}$Min denotes the minimum drilled well quantity in kou; and $P_{well}$Max denotes the maximum drilled well quantity in kou.

2. An optimization objective of the middle layer of the GHG emission control module is to minimize the GHG emission, and environmental constraints are taken into account.

$$\begin{cases} \min T_{GHG} = \sum_{i=1}^{4}\sum_{j=1}^{40} P_{water,i,j} D_{F,i,j} E_{F,i,j} + \sum_{j=1}^{40} P_{well,j} E_{well,j} + \sum_{j=1}^{40} P_{G,j} E_{G,i} + \sum_{j=1}^{40} W_{tc,j} D_{C,j} E_{C,j} + \sum_{j=1}^{40} W_{td,j} D_{Z,j} E_{Z,j} \\ T_{GHG} \le \sum_{j=1}^{40} T_{GHG,j}\,\text{Max} \end{cases}$$

$T_{GHG}$ denotes the total greenhouse gas emission in the planning period, the unit thereof is kg;

$P_{water}$ denotes the freshwater resource supply in gal;

$D_F$ denotes the distance between freshwater resource and a gas production zone, the unit thereof is km;

$E_F$ denotes the greenhouse gas emission intensity of freshwater resource per unit of transport, the unit thereof is kg/(km·gal);

$E_{well}$ denotes the greenhouse gas emission intensity during drilling and hydraulic fracturing of single well, the unit thereof is kg;

$E_G$ denotes the greenhouse gas emission intensity during gas production per unit, the unit thereof is kg/bcf;

$W_{tc}$ denotes the wastewater treatment amount of a compact wastewater treatment system (CWT), the unit thereof is gal;

$D_C$ denotes the average distance between the CWT and the gas production zone, the unit thereof is km;

$E_C$ denotes the greenhouse gas emission intensity of wastewater per treatment unit of the CWT, the unit thereof is kg/(km·gal);

$W_{td}$ denotes the wastewater treatment amount of an injection well, the unit thereof is gal;

$D_Z$ denotes the average distance between the injection well and the gas production zone, the unit thereof is km;

$E_Z$ denotes the greenhouse gas emission intensity of wastewater per treatment unit of the injection well, the unit thereof is kg/(km·gal); and $T_{GHG}$Max denotes the maximum allowable greenhouse gas emission in kg.

3. An optimization objective of the lower layer of the water resource conservation module is to minimize the water consumption, and the constraints of water supply and demand, and capacity constraints of equipment such as a CWT, the injection well, and on-site treatment equipment are taken into account.

$$\begin{cases} \text{Min} T_{WC} = \sum_{i=1}^{4}\sum_{j=1}^{40} P_{water,i,j} - \sum_{j=1}^{40} W_{tc,j} - \sum_{j=1}^{40} W_{td,j} - \sum_{j=1}^{40} W_{to,j} \\ P_{water,i,j}\text{Min} \le \sum_{i=1}^{4}\sum_{j=1}^{40} P_{water,i,j} \le P_{water,i,j}\text{Max} \\ \sum_{i=1}^{4}\sum_{j=1}^{40} W_{tc,i,j} \le W_{tc,i,j}\text{Max} \\ \sum_{i=1}^{4}\sum_{j=1}^{40} W_{td,i,j} \le W_{td,i,j}\text{Max} \\ \sum_{i=1}^{4}\sum_{j=1}^{40} W_{to,i,j} \le W_{to,i,j}\text{Max} \end{cases}$$

$T_{WC}$ denotes the water consumption of a shale gas supply system, the unit thereof is gal;

$P_{water}$Min denotes the minimum supply of freshwater resource, the unit thereof is gal;

$P_{water}$Max denotes the maximum supply of freshwater resource, the unit thereof is gal;

$W_{to}$ denotes the on-site wastewater treatment amount in gal;

$W_{tc}$Max denotes the maximum treatment capacity of the CWT, the unit thereof is gal;

$W_{td}$Max denotes the maximum treatment capacity of the injection well, the unit thereof is gal; and $W_{to}$Max denotes the maximum on-site treatment capacity in gal.

Step 2: model parameters and constraint values are set, i.e., the constraint values of the model are set according to the water resources in a shale gas area, the technologies, the environments, and natural conditions, wherein the model parameters include the gas output, the water supply and demand, the equipment capacity, etc.

For example, 10 years is selected as a full-life planning period, each quarter is a planning unit, and there are a total of 40 planning units; the technical exploitable amount of a gas reservoir in the area reaches up to $4.10\times10^5$ bcf (1 bcf=$2.8317\times10^7$ $m^3$); the amount of water used for fracturing of a single horizontal well reaches $(4.15\text{-}5.6)\times10^6$ gal (1 gal=3.7854 L). Three types of wastewater treatment modes: the CWT, the injection well, and the on-site treatment equipment are taken into account; water demands for single well drilling, hydraulic fracturing, and gas production phases are $3\times10^4$, $380\times10^4$ and $1\times10^4$ gal respectively; average distances between the water source area and the gas production zone, between the CWT and the gas production zone, and between the injection well and the gas production zone are 10 km, 15 km and 20 km respectively; and the maximum drilled well quantity is 600 kou, and the maximum gas output per quarter is 0.018 bcf, which is in line with the law of exponentially decreasing the output.

Step 3: the multi-objective function decision optimization model is solved by using the NSGA-II, i.e., an appropriate population size, genetic operation parameters, termination criteria, etc. are selected.

An NSGA-II-based Gamultiobj function in a Matlab optimization toolbox is used.

For example: parameters of the Gamultiobj function in the optimization toolbox are set: the population size is 1,000; a crossover rate is set to be 0.8, in intermediate crossover; a variation probability is set to be 0.2; a forward migration rate is 0.2, and an interval is 30; and the degree of eliteness of Pareto is set to be 0.60.

Step 4: optimal Pareto frontiers are obtained, and a decision maker selects a satisfactory solution from a Pareto frontier list.

For example, within the planning period, the optimal Pareto frontiers, i.e., the shale gas output of 882.31 bcf, the GHG emission of $39{,}008.00\times10^8$ kg, and the water consumption of $623.79\times10^3$ gal are obtained from the Pareto frontier list. Correspondingly, the allocation percentage of the surface water is 61.04%, the allocation percentage of the ground water is 13.85%, the allocation percentage of the recycled water is 19.51%, the allocation percentage of the purchased water is 5.6%, and a flowback percentage is 84.9%.

The automatic anti-noise compensation controller receives an electrical signal $e_u(t)$, x(t) and a fluctuating value Δx(t) affected by interferences, and outputs the decision variable u(t) at the moment t.

After the adverse effects of the time difference, the position change, etc. are comprehensively taken into account, a design may be performed according to an automatic anti-noise compensation control model as follows:

$$\begin{cases} u(t) = K_P e_u(t) + K_I \int_0^t e(\delta)d\delta + \Delta u_T(t) + \Delta u_D(t) + \Delta u_{OD}(t) \\ \Delta u_T(t) = \alpha f(\Delta x_T) \\ \Delta u_D(t) = \beta g(\Delta x_D) \\ \Delta u_{OD} = \gamma h(\Delta x_{OD}) \end{cases}$$

wherein $K_P$ denotes the proportional coefficient; $K_I$ denotes the integration coefficient; $e_u(t)$ denotes the difference between the optimal decision variable u*(t) and a predicted value up(t);

$\Delta u_T(t)$, $\Delta u_D(t)$, $\Delta u_{OD}$ (t) respectively correspond to compensation values for fluctuations of the decision variable due to the observation time difference, the position change, and other interferences respectively;

$\Delta x_T$, $\Delta x_D$, $\Delta x_{OD}$ respectively correspond to fluctuations of an observation input value due to the time difference, the position change, and the other interferences;

f $(\Delta x_T)$, $g(\Delta x_D)$, $h(\Delta x_{OD})$ respectively correspond to a time difference function, a position change function, and a compensation function for other interferences, which may be obtained by fitting a large number of samples in a database; and α, β, γ are a time difference parameter, a position change parameter, and a compensation parameter corresponding to the other interferences respectively, which are configured to correct a value of the compensation function, so as to obtain a more accurate decision value.

One of the error regulators is configured to correct the errors between the actually measured values y(t) and predicted values $y_p(t)$ of the gas output, the GHG emission, the water consumption, etc. and output the electrical signal $e_y(t)$ to the multi-objective decision optimizer; and the other of the error regulators is configured to correct the errors between the optimal values u*(t) and predicted values $u_p(t)$ of the allocation percentage, the flowback percentage, the purchase percentage, etc. and transmit the electrical signal $e_u(t)$ to the automatic anti-noise compensation controller.

The water volume regulation allocator is configured to automatically open and control the flow control valve of each part according to the decision variable u(t), so as to achieve intelligent allocation control of the water sources through different degrees of opening.

The flow control valves are configured to automatically control the incoming water flows of the various water sources by regulating the degrees of opening thereof under command signals of the water volume regulation allocator.

What is claimed is:

1. An intelligent circulation and allocation control system for multiple surface and ground water resources, comprising a physical, chemical and biological multi-stage decentralized restoration system, wherein the physical, chemical and biological multi-stage decentralized restoration system is respectively connected with a water quality detection and reinjection system, an integrated data processing system, an intelligent safety early warning system, and an asynchronous and self-adaptive dual-regulation optimization control system; and the water quality detection and reinjection system is further connected with the intelligent safety early warning system, the intelligent safety early warning system is further connected with the integrated data processing system, and the integrated data processing system is further connected with the asynchronous and self-adaptive dual-regulation optimization control system.

2. The intelligent circulation and allocation control system for multiple surface and ground water resources according to claim 1, wherein, the physical, chemical and biological multi-stage decentralized restoration system is configured to restore various water sources required for shale gas exploitation;

the water quality detection and reinjection system is configured to detect water quality of the restored water resources and determine whether the water quality reaches standards;

the integrated data processing system is configured to monitor and collect information, including water volumes, temperatures, and pH, of the various water sources in real time, process and feedback collected data and transmit the processed data to the asynchronous and self-adaptive dual-regulation optimization control system;

the intelligent safety early warning system is configured to monitor and collect on-site image data and various safety information of the physical, chemical and biological multi-stage decentralized restoration system and the water quality detection and reinjection system, simulate an on-site operation scenario on line, timely give an early warning and handle various safety accidents and transmit important data to the integrated data processing system;

and the asynchronous and self-adaptive dual-regulation optimization control system is configured to receive signal feedbacks transmitted from the integrated data processing system, combine the obtained data to perform optimized simulation and prediction of water volumes and water quality of the various water resources and perform allocation control.

3. The intelligent circulation and allocation control system for multiple surface and ground water resources according to claim 1, wherein, the physical, chemical and biological multi-stage decentralized restoration system comprises a recycled water collection device, a ground water collection device, a surface water collection device, and a purchased water collection device;

the recycled water collection device is sequentially connected with a two-phase gas floatation separator, a multi-stage membrane reverse filter tank, a pH regulator, an ozone aeration and jet reaction tower, a microbial filter tank, a heavy magnetic coagulation flocculation self-circulation device, a first sedimentation tank, and a mixing tank;

water outlet ends of the ground water collection device and the surface water collection device are sequentially connected with a first sand sedimentation tank, a coagulation reaction tank, a second sedimentation tank, and the mixing tank; and the purchased water collection device is sequentially connected with a second sand sedimentation tank and the mixing tank.

4. The intelligent circulation and allocation control system for multiple surface and ground water resources according to claim 3, wherein, the water quality detection and reinjection system comprises a water quality detector and a standard water reinjection device, and the water quality detector is respectively connected with the mixing tank, the pH regulator, and the standard water reinjection device.

5. The intelligent circulation and allocation control system for multiple surface and ground water resources according to claim 1, wherein, the intelligent safety early warning system comprises a main module, the main module comprises a control device, and the main module is respectively connected with a face recognition module, a data communication module, a background monitoring module, a smoke alarm module, a pulse alarm module, an emergency handling module, and a voice broadcast module.

6. The intelligent circulation and allocation control system for multiple surface and ground water resources according to claim 1, wherein, the integrated data processing system comprises a sensor, and an output end of the sensor is sequentially connected with a data collector, an analog-to-digital converter, and a data processing center; and the sensor has an input end connected with the physical, chemical and biological multi-stage decentralized restoration system and the output end connected with an input end of the asynchronous and self-adaptive dual-regulation optimization control system, and the sensor is configured to monitor the pH, temperatures, electrical conductivity, water volumes, dissolved oxygen, biochemical oxygen demands, and gas outputs at each moment of collected water sources.

7. The intelligent circulation and allocation control system for multiple surface and ground water resources according to claim 6, wherein, the asynchronous and self-adaptive dual-regulation optimization control system comprises a data input device, an output end of the data input device is respectively connected with a first error regulator, a multi-modal integrated simulation and prediction device, an automatic anti-noise compensation controller, and a multi-objective decision optimizer, an output end of the multi-modal integrated simulation and prediction device is connected with the first error regulator, and an output end of the first error regulator is connected with an input end of the multi-objective decision optimizer;

an output end of the multi-objective decision optimizer is respectively connected with the multi-modal integrated simulation and prediction device and a first input end of a second error regulator, and a second input end of the second error regulator is connected with the output end of the multi-modal integrated simulation and prediction device; an output end of the second error regulator is connected with the automatic anti-noise compensation controller; and an output end of the automatic anti-noise compensation controller is connected with an input end of a water volume regulation allocator, and an output end of the water volume regulation allocator is respectively connected with a recycled water flow control valve of the recycled water collection device, a ground water flow control valve of the ground water collection device, a surface water flow control valve of the surface water collection device, and a purchased water flow control valve of the purchased water collection device.

8. The intelligent circulation and allocation control system for multiple surface and ground water resources according to claim 7, wherein, a workflow of the asynchronous and self-adaptive dual-regulation optimization control system is as follows:

the data input device takes data including water volume, biological oxygen demand (BOD), and chemical oxygen demand (COD) transmitted by the data processing center at a moment t as an input variable x(t) and data such as gas outputs, greenhouse gas (GHG) emissions, and water consumptions at the moments t−1 and t as an optimized objective variable y(t−1), and inputs y(t) to the multi-modal integrated simulation and prediction device, the automatic anti-noise compensation controller, the multi-objective decision optimizer, and the corresponding error regulator;

the multi-modal integrated simulation and prediction device adopts a multi-layer stacking model integration framework, wherein a first layer comprises a plurality of base learners, the input variable x(t), the historical optimized objective variable y(t−1), and an optimized decision variable u'(t) serve as an original training set, a second layer of model adds outputs of the base learners of the first layer as features to the original training set for retraining to obtain a training set thereof, until a final layer obtains a complete stacking model, and a simulated and predicted value $y_p(t),u_p(t)$ is output; and the multi-objective decision optimizer optimizes the gas output, the GHG emission, and the water consumption by using a nondominated sorting genetic algorithm II (NSGA-II), receives x(t) and $e_y(t)$ transmitted from the data input device and the corresponding error regulator, outputs the instantaneous optimized decision variable u'(t) to the multi-modal integrated simulation and prediction device, and continuously regulates feedbacks to obtain an optimal decision variable u*(t), wherein constraint conditions including aspects of technologies, environments, and nature.

9. The intelligent circulation and allocation control system for multiple surface and ground water resources according to claim 8, wherein, an optimization method of the multi-objective decision optimizer comprises the following steps:

step 1: building a multi-objective function decision optimization model, i.e., a shale gas-environment-water resource model, wherein the multi-objective function decision optimization model comprises an efficient shale gas production module, a GHG emission control module, and a water resource conservation module;

step 2: setting model parameters and constraint values;

step 3: solving, by using the NSGA-II, the multi-objective function decision optimization model; and step 4: obtaining optimal Pareto frontiers, and selecting, by a decision maker, a satisfactory solution from a Pareto frontier list.

10. The intelligent circulation and allocation control system for multiple surface and ground water resources according to claim 9, wherein, in the step 1, the multi-objective function decision optimization model comprises an upper layer of the efficient shale gas production module, a middle layer of the GHG emission control module, and a lower layer of the water resource conservation module, and the multi-objective function decision optimization model is specifically as follows:

1) an optimization objective of the upper layer of the efficient shale gas production module is to maximize a shale gas output, the shale gas output is in line with an exponentially decreasing trend, a decreasing rate D is introduced, and the constraint of a single-well gas output, the exploitation scale, the constraint of a drilled well quantity, etc. are taken into account;

$$\begin{cases} \max P_G = \sum_{j=1}^{40} P_{well,j} P_{g,j} e^{-D_j t_j} \\ P_g\text{Min} \le P_{g,j} \le P_g\text{Max} \\ P_{well}\text{Min} \le P_{well,j} \le P_{well}\text{Max} \\ D_{min} \le D_j \le D_{max} \end{cases}$$

wherein subscript i denotes the type of freshwater resource (i=1 represents the surface water, i=2 represents the ground water, i=3 represents purchased water, and i=4 represents recycled water), and subscript j denotes a planning period, wherein 10a is selected as a planning period and each quarter is taken as a planning unit (i.e., the planning period j=1, 2, 3, 40);

$P_G$ denotes the total shale gas output in the planning period, the unit thereof is bcf;

$P_{well}$ denotes the drilled well quantity in kou;

$P_g$ denotes the single-well shale gas output in bcf;

D denotes the decreasing rate of the shale gas output;

$D_{min}$ denotes the decreasing rate of the minimum shale gas output;

$D_{max}$ denotes the decreasing rate of the maximum shale gas output;

t denotes actual production time in a planning unit, the unit thereof is h;

$P_G$Min denotes the minimum shale gas output in the planning period, the unit thereof is gal;

$P_G$Max denotes the maximum shale gas output in a life cycle, the unit thereof is gal;

$P_{well}$Min denotes the minimum drilled well quantity in kou; and $P_{well}$Max denotes the maximum drilled well quantity in kou;

2) an optimization objective of the middle layer of the GHG emission control module is to minimize the GHG emission, and environmental constraints are taken into account;

$$\begin{cases} \min T_{GHG} = \sum_{i=1}^{4} \sum_{j=1}^{40} P_{water,i,j} D_{F,i,j} E_{F,i,j} + \sum_{j=1}^{40} P_{well,j} E_{well,j} + \sum_{j=1}^{40} P_{G,j} E_{G,i} + \sum_{j=1}^{40} W_{tc,j} D_{C,j} E_{C,j} + \sum_{j=1}^{40} W_{td,j} D_{Z,j} E_{Z,j} \\ T_{GHG} \le \sum_{j=1}^{40} T_{GHG,j}\text{Max} \end{cases}$$

$T_{GHG}$ denotes the total greenhouse gas emission in the planning period, the unit thereof is kg;

$P_{water}$ denotes the freshwater resource supply in gal;

$D_F$ denotes the distance between freshwater resource and a gas production zone, the unit thereof is km;

$E_F$ denotes the greenhouse gas emission intensity of freshwater resource per unit of transport, the unit thereof is kg/(km·gal);

$E_{well}$ denotes the greenhouse gas emission intensity during drilling and hydraulic fracturing of single well, the unit thereof is kg;

$E_G$ denotes the greenhouse gas emission intensity during gas production per unit, the unit thereof is kg/bcf;

$W_{tc}$ denotes the wastewater treatment amount of a compact wastewater treatment system (CWT), the unit thereof is gal;

$D_C$ denotes the average distance between the CWT and the gas production zone, the unit thereof is km;

$E_C$ denotes the greenhouse gas emission intensity of wastewater per treatment unit of the CWT, the unit thereof is kg/(km·gal);

$W_{td}$ denotes the wastewater treatment amount of an injection well, the unit thereof is gal;

$D_Z$ denotes the average distance between the injection well and the gas production zone, the unit thereof is km;

$E_Z$ denotes the greenhouse gas emission intensity of wastewater per treatment unit of the injection well, the unit thereof is kg/(km·gal); and $T_{GHG}$ Max denotes the maximum allowable greenhouse gas emission in kg; and 3) an optimization objective of the lower layer of the water resource conservation module is to minimize the water consumption, and the constraints of water supply and demand, and the capacity constraints of equipment such as a CWT, the injection well, and on-site treatment equipment are taken into account;

$$\begin{cases} \mathrm{Min}T_{WC} = \sum_{i=1}^{4}\sum_{j=1}^{40} P_{water,i,j} - \sum_{j=1}^{40} W_{tc,j} - \sum_{j=1}^{40} W_{td,j} - \sum_{j=1}^{40} W_{to,j} \\ P_{water,i,j}\mathrm{Min} \le \sum_{i=1}^{4}\sum_{j=1}^{40} P_{water,i,j} \le P_{water,i,j}\mathrm{Max} \\ \sum_{i=1}^{4}\sum_{j=1}^{40} W_{tc,i,j} \le W_{tc,i,j}\mathrm{Max} \\ \sum_{i=1}^{4}\sum_{j=1}^{40} W_{td,i,j} \le W_{td,i,j}\mathrm{Max} \\ \sum_{i=1}^{4}\sum_{j=1}^{40} W_{to,i,j} \le W_{to,i,j}\mathrm{Max} \end{cases}$$

$T_{WC}$ denotes the water consumption of a shale gas supply system, the unit thereof is gal;

$P_{water}$Min denotes the minimum supply of freshwater resource, the unit thereof is gal;

$P_{water}$Max denotes the maximum supply of freshwater resource, the unit thereof is gal;

$W_{to}$ denotes the on-site wastewater treatment amount in gal;

$W_{tc}$Max denotes the maximum treatment capacity of the CWT, the unit thereof is gal;

$W_{td}$Max denotes the maximum treatment capacity of the injection well, the unit thereof is gal; and $W_{to}$Max denotes the maximum on-site treatment capacity in gal.

* * * * *